Nov. 8, 1960     F. K. MÖLLRING     2,959,097

ILLUMINATING DEVICE FOR MICROSCOPES

Filed May 8, 1959

2,959,097
ILLUMINATING DEVICE FOR MICROSCOPES

Friedrich Karl Mollring, Aalen, Germany, assignor to Carl Zeiss, Heidenheim-Brenz, Germany Filed May 8, 1959, Ser. No. 812,072

Claims priority, application Germany May 14, 1958

1 Claim. (Cl. 88—40)

The present invention relates to an illuminating device for microscopes which permits the taking of photographs of the object to be inspected by means of a flash more particularly of an electronic flash.

For the purpose of photographing the images observed by means of a microscope a light source of high luminous density with constant brightness over the light emitting area is required. The light coming from this source must have about the same spectral distribution as daylight. It is of prior art to use continuously lighting special lamps which satisfy said requirements. Such lamps, however, are very expensive and require a great outlay on circuitry. One significant disadvantage of all continuously lighting high efficiency light sources is that the specimens to be inspected are exposed to the full radiation load even in the intervals between the exposures.

For said reasons one has tried to use flash bulbs as light sources in photomicrography. A flash unit requires the lowest outlay of all high efficiency light sources, it allows the most usual daylight films to be used for colour photography and it renders the photomicrographic equipment insensitive to vibrations owing to the short duration of the flash.

Photographic equipments are of prior art in which an image of the entire flash bulb is produced in the entrance pupil of the microscope by means of a collector lens of long focal length. Such devices have the disadvantage that they are very expensive in consequence of the great outlay required and that they have low efficiency owing to the large luminous area.

Furthermore, it is of prior art to arrange a concave mirror behind a light source which continuously illuminates the object to be observed and to form the intermediate image of the light source produced by the said mirror in the entrance pupil of the microscope by means of a collector. In this illuminating arrangement the flash bulb is placed at the place of the intermediate image of the light source. This arrangement of prior art has the disadvantage that it still requires a relatively large outlay and that its space requirements are large. Furthermore, in this arrangement of prior art only a small portion of the flash bulb is employed so that the luminous density attainable is not very high.

The illuminating device according to the present invention avoids all the aforesaid disadvantages. It contains a light source which continuously illuminates the object to be observed, a collector serving to produce an image of the light source in the entrance pupil of the microscope, an additional component consisting of two telecentrically arranged lens systems which in their common focal plane produce an image of the light emitting zone of the light source of approximately full size and further image the said intermediate image in the entrance pupil of the microscope, and a flash bulb which is arranged at the place of the said intermediate image. The diameter of the discharge gap of said flash bulb is chosen in such a way that it practically coincides with the size of said intermediate image. From this reason the luminous density of said flash bulb is very high.

The flash unit operating the flash bulb of the new illuminating device has a power requirement of about 50 wsec. Compared with this an energy of 200 to 400 wsec. is required by using the micro flash units of prior art. By the reduction of the energy required in the use of the flash unit it is obtained that the electrical outlay is reduced and that the dimensions of the flash unit are small. Because of the handiness and of the small energy requirements of the flash unit it is possible to take the new illuminating device conveniently along on excursions. The flash unit can be run from batteries or from a car battery without special arrangements.

It is a further object of the invention to construct the illuminating device in such a way that it consists of two construction elements capable of being attached to each other the first of which contains the incandescent bulb with the corresponding collector and can be attached to the microscope at will either directly or with interposition of the second construction element containing the other components. For this purpose it is advantageous to design the two construction elements as cylindrical sleeves fitted with means for connection identical in type and size.

It is possible to arrange said second construction element in such a way that it can be swivelled in or out of the path of the light emanating from said light source by means of a mechanical device.

For obtaining optimum conditions it is advantageous to combine the collector corresponding to the light source as well as the lens systems of the second component of the same kind of optical elements.

It is advantageous to use a flash bulb which is designed as a straight bar. This flash bulb is arranged within a frame which can be swivelled or slid into said second construction element.

In the accompanying drawings Figures 1 and 2 show an embodiment of the illuminating device according to the invention.

Figure 1:
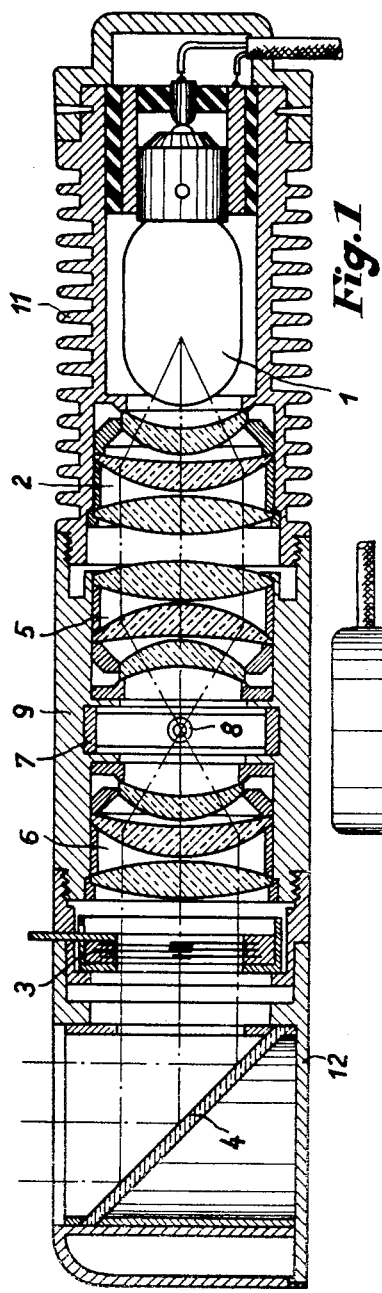
Fig. 1 is a section through the novel illuminating device.
Figure 2:
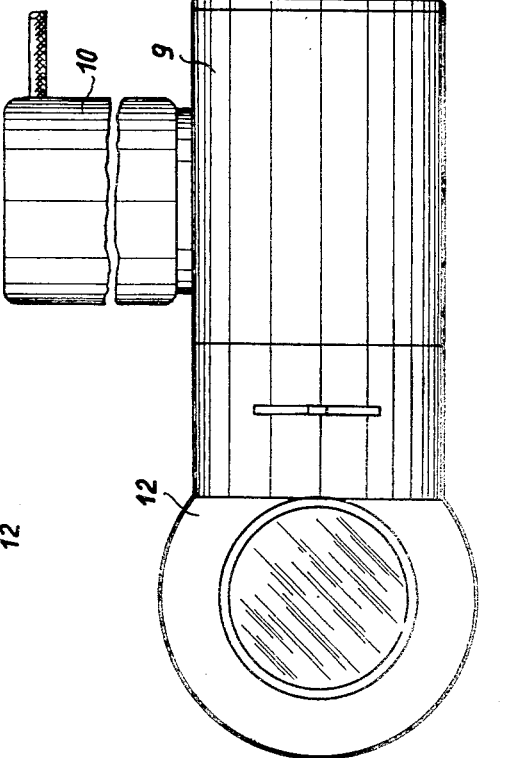
Fig. 2 shows the novel illuminating device in plan view.

By 1 there is designated a continuously lighting light source which is imaged by means of a collector 2 in the entrance pupil of a microscope which is not represented. An iris diaphragm 3 serves to control the diameter of the light beam. The light source 1 and the collector lens 2 are arranged within a housing 11 forming a first construction element which is directly screwed to the housing 12 containing the iris diaphragm 3 and the mirror 4 when no flash photographs are to be taken.

If it is desired to take flash photographs then a further construction element 9 is inserted between the housings 11 and 12. This construction element is equipped at its front end turned towards the mirror 4 with the same means for connection as the housing 11 at its front end. The rear end of the construction element 9 turned towards the lamp 1 is equipped with the same means for connection as the rear end of the housing 12.

The construction element 9 contains two telecentrically arranged lens systems 5 and 6. The lens system 5 produces an intermediate image of the light emitting zone of the light source 1 of approximately full size in the common focal plane of the lens systems. The lens system 6 forms a further image of said intermediate image in the entrance pupil of the microscope. At the place of said intermediate image a flash bulb 8 is located which practically coincides in the diameter of its discharge gap with the size of the intermediate image. Said flash bulb is bar-shaped and is supported in a frame 7 capable of being shifted into or out of the construction element 9. Attached to the frame 7 is a small housing 10 which contains the flash unit.

The frame 7 is with advantage fitted with a device which clicks into position when the frame is pushed in and which thereby guarantees correct adjustment of the flash bulb. The flash bulb is allowed to remain in situ also during visual observation in the intervals between taking photographs since it reduces the luminosity of the light coming from the light source 1 and going to the mirror 4 only insignificantly.

As can be seen in Fig. 1 the collector 2 and the lens systems 5 and 6 consist of the same optical elements. By this arrangement it is attained that the flash bulb can be kept to a minimum size.

The flash unit must produce an energy of about 50 wsec. so that its dimensions can be kept very small. The charging time of the condenser of the flash unit used for feeding the flash bulb 8 is extremely short owing to the low capacity of this condenser. This makes it possible to use the illuminating device described and represented herein also for cine-micrography. In this case the photographic exposures are made with the most rapid flash sequence possible. Also in this case the radiation load of the object is kept low by using the novel illuminating device.

I claim:

An illuminating device for a microscope comprising a light source for continuous microscope illumination and a flash tube for microscope flash-photography, said device having, in combination, a first construction element designed as a cylindrical sleeve and comprising said light source and a collector for forming an image of the light emitting zone of said light source in the entrance pupil of said microscope, and a second construction element designed as a cylindrical sleeve which comprises two telecentrically arranged lens systems and said flash tube arranged in the common focal plane of said lens systems, said first construction element being attachable to the microscope at will either immediately or with interposition of said second construction element whereby in the latter case the two lens systems produce an intermediate image of the light emitting zone of said light source in their common focal plane, said intermediate image having the full size of the light emitting zone of said light source, said two lens systems forming a further image of said intermediate image in the entrance pupil of the microscope, said flash tube having a light-transparent envelope the diameter of which coincides with the size of said intermediate image.

References Cited in the file of this patent
UNITED STATES PATENTS 2,471,879    Lowber et al. _____ May 31, 1949
2,893,289    Edgerton _____ July 7, 1959

OTHER REFERENCES

Microtenic, vol. XI, No. 5, pp. 221 and 222 relied upon.